United States Patent
Okumura et al.

(10) Patent No.: US 12,395,005 B2
(45) Date of Patent: Aug. 19, 2025

(54) POWER SOURCE POLE AND ILLUMINATION DEVICE USING SAME, AND MULTIFUNCTIONAL DEVICE

(71) Applicant: NEXT JAPAN MARKETING CENTER CO., LTD., Osaka (JP)

(72) Inventors: Masayuki Okumura, Osaka (JP); Kensuke Kono, Osaka (JP)

(73) Assignee: Next Japan Marketing Center Co., Ltd., Osaka (JP)

( * ) Notice: Subject to any disclaimer, the term of this patent is extended or adjusted under 35 U.S.C. 154(b) by 0 days.

(21) Appl. No.: 18/695,167

(22) PCT Filed: Sep. 22, 2022

(86) PCT No.: PCT/JP2022/035454
§ 371 (c)(1),
(2) Date: Mar. 25, 2024

(87) PCT Pub. No.: WO2023/048253
PCT Pub. Date: Mar. 30, 2023

(65) Prior Publication Data
US 2025/0183697 A1    Jun. 5, 2025

(30) Foreign Application Priority Data

Sep. 27, 2021    (JP) ................. 2021-156974

(51) Int. Cl.
*H02J 7/35*    (2006.01)
*F21S 8/08*    (2006.01)
(Continued)

(52) U.S. Cl.
CPC .............. *H02J 7/35* (2013.01); *F21S 8/086* (2013.01); *F21S 9/03* (2013.01); *H02J 3/32* (2013.01);
(Continued)

(58) Field of Classification Search
CPC ........ H02J 7/35; H02J 3/32; H02J 3/38; H02J 2300/24; H02S 20/10; H02S 40/38; F21S 58/086; F21S 9/03; F21S 58/08
See application file for complete search history.

(56) References Cited

U.S. PATENT DOCUMENTS 6,060,658 A    5/2000    Yoshida et al.

FOREIGN PATENT DOCUMENTS

EP    0 849 524    6/1998
JP    10-233236    9/1998
(Continued)

OTHER PUBLICATIONS

International Search Report issued in International Application No. PCT/JP2022/035454, Nov. 8, 2022, 5 pages w/translation.

*Primary Examiner* — Robert L Deberadinis
(74) *Attorney, Agent, or Firm* — HMSL P.C.

(57) ABSTRACT

A power source pole of the present application includes a pole main body, a solar cell module, a storage battery, and a power source side connector. The solar cell module and the power source side connector are located outside the pole main body. The storage battery is charged with electric power generated by the solar cell module. The electric power of the storage battery is output to the outside through the power source side connector. An illumination apparatus of the present application includes the power source pole of the present application and a light emission unit. A multifunctional apparatus of the present application includes the power source pole of the present application and an outside unit.

8 Claims, 5 Drawing Sheets

(51) Int. Cl.
*F21S 9/03* (2006.01)
*H02J 3/32* (2006.01)
*H02J 3/38* (2006.01)
*H02S 20/10* (2014.01)
*H02S 40/38* (2014.01)

(52) U.S. Cl.
CPC ............... *H02J 3/38* (2013.01); *H02S 20/10* (2014.12); *H02S 40/38* (2014.12); *H02J 2300/24* (2020.01)

(56) References Cited

FOREIGN PATENT DOCUMENTS

| | | |
|---|---|---|
| JP | 2016-185037 | 10/2016 |
| JP | 2018-156894 | 10/2018 |
| JP | 2021-141693 | 9/2021 |

POWER SOURCE POLE AND ILLUMINATION DEVICE USING SAME, AND MULTIFUNCTIONAL DEVICE

TECHNICAL FIELD

The present application relates to a power source pole, and an illumination apparatus and a multifunctional apparatus including the power source pole.

BACKGROUND ART

A conventional pole having solar cells includes solar cell modules attached approximately vertically on a peripheral wall of a pole main body, and has the function of generating electric energy utilizing solar radiation afforded by at least scattered sunlight selected from scattered sunlight or direct sunlight (Patent Document 1).

Such a pole having solar cells occupies a small area and thus can be installed at any location. Further, an external apparatus, such as illumination equipment such as an outdoor lamp, a guide sign, an electric clock, or communication equipment, can be attached to the pole. That is, the pole is excellent since it can be used for the plurality of purposes according to use conditions.

PRIOR ART DOCUMENT

Patent Document

Patent Document 1: JP-A-H10-233236

DISCLOSURE OF INVENTION

Problem to be Solved by the Invention

The above-described pole having solar cells is configured to include only one of the external apparatuses. It is thus difficult to install a plurality of detachable external apparatuses on the pole to allow the pole to function as a multifunctional apparatus in harmony with an increase in the efficiency of the solar cell modules.

The present application solves this problem. As the efficiency of the solar cell modules increases, it is becoming necessary to provide the pole having solar cells with greater versatility and functionality. For this purpose, the present application provides a power source pole to and from which a plurality of external apparatuses are flexibly attachable and detachable, and a multifunctional apparatus that includes the power source pole.

Means for Solving Problem

A power source pole of the present application includes a pole main body, a solar cell module, a storage battery, and a power source side connector. The solar cell module and the power source side connector are located outside the pole main body. The storage battery is charged with electric power generated by the solar cell module. The electric power of the storage battery is output to the outside through the power source side connector.

An illumination apparatus of the present application includes the power source pole of the present application, and a light emission unit. The light emission unit includes a power receiving side connector. The power source side connector of the power source pole is connected with the power receiving side connector of the light emission unit.

A multifunctional apparatus of the present application includes the power source pole of the present application, and an outside unit. The outside unit includes a power receiving side connector. The power source side connector of the power source pole is connected with the power receiving side connector of the outside unit.

Effects of the Invention

The present application can provide a power source pole to and from which a plurality of external apparatuses are flexibly attachable and detachable, and a multifunctional apparatus that includes the power source pole.

Figure 1:
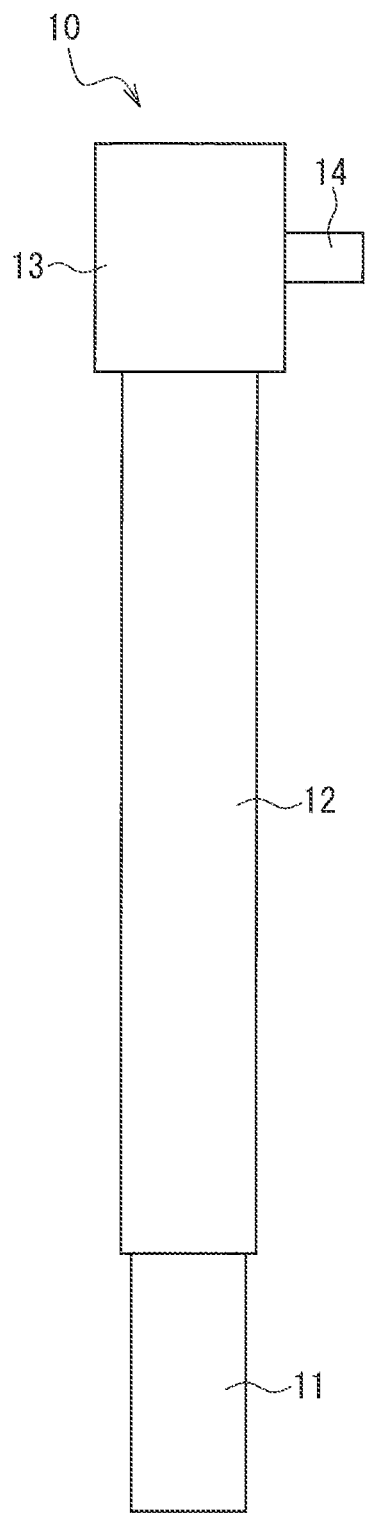
FIG. 1 is a schematic side view illustrating an exemplary power source pole of an embodiment.

DESCRIPTION OF THE INVENTION (Power Source Pole)

A power source pole of the present application includes a pole main body, a solar cell module, a storage battery, and a power source side connector. The solar cell module and the power source side connector are located outside the pole main body. The storage battery is charged with electric power generated by the solar cell module. The electric power of the storage battery is output to the outside through the power source side connector.

The power source pole of the present application, which includes the solar cell module and thus can function as an off-the-grid power source that is independent from an electrical grid, can be effectively used as a power source in a region that is isolated from an electrical grid and a region to which it is difficult to supply electric power from an electrical grid due to a natural disaster such as an earthquake.

If unseasonable weather continues for an extended time, it may be difficult to supply electric power by only the solar power generation. In preparation for such a case, the power source pole of the present application can also use commercial power sources.

Adjusting the number, location, and the like of the power source side connector of the power source pole of the present application allows, for example, outside units, such as a light emission unit, a camera unit, a sensor unit, and a communication unit, to be flexibly attached to and detached from the power source pole, and also allows them to be flexibly located. This makes it easy to provide the power source pole including the solar cell with greater versatility and functionality.

The power source side connector preferably includes a receptacle socket. This makes it easy to connect and disconnect the outside unit to and from the power source pole.

Preferably, the power source side connector is attached to the pole main body via an attachment unit that is removable. If a plurality of the attachment units having different shapes is prepared, the attachment units having various shapes can be exchangeably used according to the intended use, which allows the power source pole to be more flexibly used.

The power source side connector may also include a communication line in addition to an electric current line.

Preferably, the attachment unit has a cap-like shape and is installed at the distal end of the pole main body. This allows the outside unit to be installed at a certain height. Thus, when, e.g., a light emission unit, a camera unit, a sensor unit, or a communication unit is used as the outside unit, they are effective over wider areas.

Preferably, the attachment unit is rotatable on the central axis of the pole main body. This allows the direction of the connected outside unit to be flexibly changed according to conditions such as the installation location of the power source pole.

Preferably, the solar cell module includes a flexible solar power generation sheet wound around an exterior surface of the pole main body. This allows sunlight to be always incident on the solar power generation sheet irrespective of the position of the sun.

Hereinafter, an embodiment of the power source pole of the present application will be described with reference to the drawings.

FIG. 1 is a schematic side view illustrating an exemplary power source pole of the present embodiment. In FIG. 1, a power source pole 10 includes a pole main body 11, a solar power generation sheet 12, a connector attachment unit 13, and a power source side connector 14. The power source pole 10 functions as a pole-type solar power generation apparatus (off-the-grid power source) that includes the solar power generation sheet 12 as the solar cell module, and can perform solar power generation using the solar power generation sheet 12 when the power source pole 10 stands substantially vertically. The solar power generation sheet 12 is installed by winding the solar power generation sheet 12 around the exterior surface of the pole main body 11. The connector attachment unit 13 has a cap-like shape and is installed at the distal end of the pole main body 11. The connector attachment unit 13 includes the power source side connector 14 in the side face of the connector attachment unit 13. The pole main body 11 contains a storage battery (not shown). The storage battery is electrically connected with the power source side connector 14. The storage battery is charged with electric power generated by the solar power generation sheet 12. The electric power of the storage battery can be output to the outside through the power source side connector 14.

The power source pole 10 is a pole type that has a solar power generation function. The pole type includes, e.g., a cylindrical pole that stands substantially vertically as illustrated. The pole type also includes a wide range of poles: a polygonal pole such as a quadrangular pole; an elliptical pole; a pole formed by connecting two or more poles; a pole having a standing angle that is slightly adjusted depending on the landform and intended use; and poles that are at least partially erected, such as a foldable pole, an extendable pole, and a pole that can be housed underground.

The solar cell module refers to all things that convert light energy of, e.g., sunlight into electrical energy, and is not limited to the flexible solar power generation sheet 12, which is illustrated as one example. The solar cell module may be a plate panel formed into a cylindrical shape, or may have other configurations.

The solar power generation sheet 12 includes a transparent resin sheet that is made of a flexible material, and a solar cell device that is sealed in the resin sheet by, e.g., lamination. The solar cell device is, e.g., a flexible solar cell device such as an amorphous silicon-based thin-film solar cell. In addition to the amorphous silicon-based solar cell, various solar cells such as a compound semiconductor-based solar cell, an organic semiconductor-based solar cell, and a dye-sensitized solar cell can be used. The solar cell sheet does not include a glass substrate that is included in a crystalline silicon-based solar cell panel, and does not need a base plate for maintaining the strength of the panel, and thus has a light weight.

The solar power generation sheet 12 may be directly wound around an exterior surface of the pole main body 11. Alternatively, the solar power generation sheet 12 may be wound around an exterior surface of an elongated cylindrical tube. Then, the pole main body 11 may be inserted into the tube, and the tube may be fixed to the pole main body 11.

The pole main body 11 has a housing portion (not shown) inside the pole main body 11. The housing portion houses the storage battery (not shown) that is charged with electric power generated by the solar power generation sheet 12. The housing portion may house other built-in equipment in addition to the storage battery. The pole main body 11 may have a ground portion (not shown) in the lower portion of the pole main body 11. The ground portion grounds and supports the entire pole. The pole main body 11 may be constituted as an integral member or a plurality of components. The pole main body 11 may be extendable or transformable.

Examples of the storage battery include a nickel-hydrogen battery and a lithium-ion battery. The nickel-hydrogen battery is suitable since it has a light weight and a large electric capacity. Examples of the built-in equipment other than the storage battery include an electric power regulator of the storage battery, and a controller that controls the outside unit that is connected with the power source pole 10. The outside unit to be connected with the power source pole 10 may be, e.g., a light emission unit, a camera unit, a sensor unit, or a communication unit, as will be described in detail later.

The connector attachment unit 13 is attached to the distal end of the pole main body 11. The power source side connector 14 is installed in the side face of the connector attachment unit 13. The connector attachment unit 13 may be fixed to or removable from the pole main body 11. The connector attachment unit 13 may be rotatable on the central axis of the pole main body 11. If the connector attachment unit 13 is rotatable around the pole main body 11, it is easy to change the direction of the power source side connector 14.

The power source side connector 14 is not limited to a particular form, but is preferably in the form of a receptacle socket. The receptacle socket makes it easy to attach and detach a power receiving side connector to and from the power source side connector 14. The power source side connector 14, which includes an electric current line, preferably includes a communication line in addition to the electric current line. This allows information data to be exchanged with the outside unit that is connected with the power source pole 10. For example, if the housing portion of the pole main body 11 houses a communication apparatus as the built-in equipment, and a camera unit as the outside unit is connected with the power source pole 10 through the power source side connector 14, image data can be transferred to the communication apparatus from the camera unit through the communication line, and then transmitted to the outside from the communication apparatus.

Figure 2:
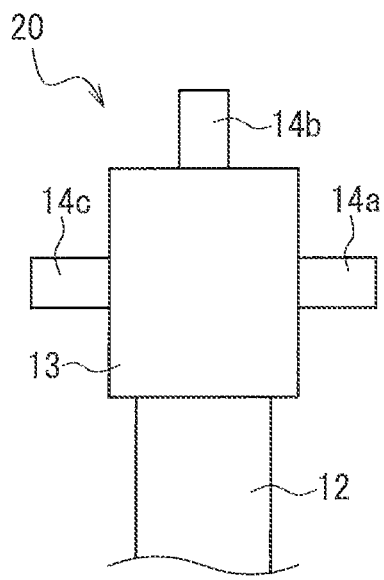
FIG. 2 is a schematic partial side view illustrating another exemplary power source pole of the embodiment.

FIG. 2 is a schematic partial side view illustrating another exemplary power source pole of the present embodiment. In FIG. 2, a power source pole 20 includes a solar power generation sheet 12 that is attached to a pole main body, a connector attachment unit 13, and power source side connectors 14a, 14b, and 14c. As illustrated in FIG. 2, providing the plurality of power source side connectors 14a, 14b, and 14c in the top face and side face of the connector attachment unit 13 allows the power source side connectors to be more flexibly oriented. If the connector attachment unit 13 is rotatable on the central axis of the pole main body, the power source side connectors are even more flexibly oriented. Preferably, the power source side connectors 14a, 14b, and 14c each include a communication line in addition to an electric current line.

(Illumination Apparatus)

An illumination apparatus of the present application includes the above-described power source pole of the present application, and a light emission unit. The light emission unit includes a power receiving side connector. The power source side connector of the power source pole is connected with the power receiving side connector of the light emission unit.

The illumination apparatus of the present application includes the power source pole that can function as an off-the-grid power source that is independent from an electrical grid, and the light emission unit that is supplied with electric power from the power source pole. Thus, the illumination apparatus of the present application can be effectively used in a region that is isolated from an electrical grid and a region to which it is difficult to supply electric power from an electrical grid due to a natural disaster such as an earthquake.

In the illumination apparatus of the present application, since the power source side connector of the power source pole is connected with the power receiving side connector of the light emission unit, the light emission unit can be flexibly removed from the power source pole. This facilitates the replacement and maintenance of the light emission unit. Adjusting the number, location, and the like of the power source side connector of the power source pole makes it easy to change the direction of the light emission unit.

The power receiving side connector preferably includes a plug pin. This makes it easy to connect and disconnect the light emission unit to and from the power source pole.

Hereinafter, an embodiment of the illumination apparatus of the present application will be described with reference to the drawings. However, the explanation for the power source pole of the present application will not be repeated.

Figure 3:
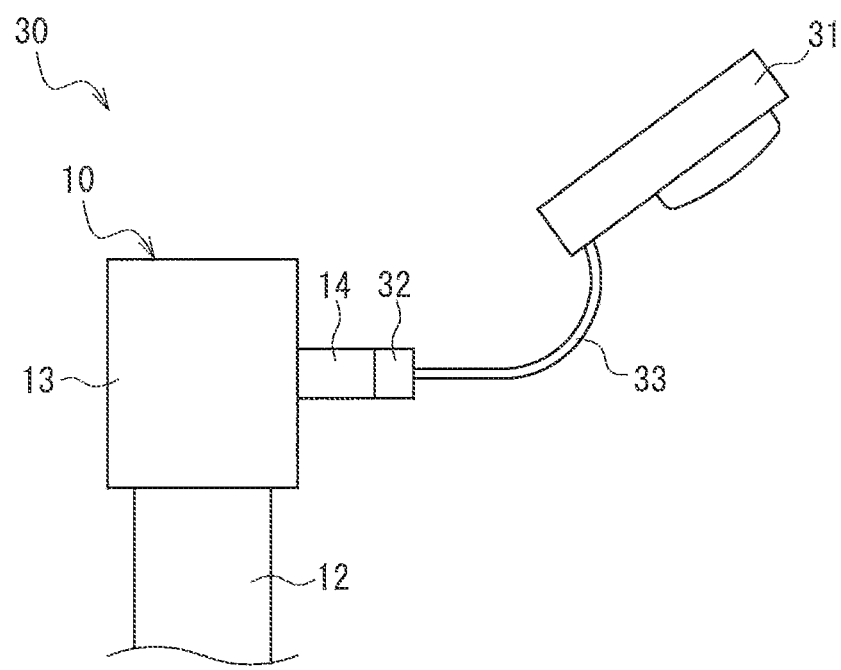
FIG. 3 is a schematic partial side view illustrating an exemplary illumination apparatus of an embodiment.

FIG. 3 is a schematic partial side view illustrating an exemplary illumination apparatus of the present embodiment. In FIG. 3, an illumination apparatus 30 includes the power source pole 10 as illustrated in FIG. 1, and a light emission unit 31. The power source side connector 14 is provided in the side face of the connector attachment unit 13 of the power source pole 10. The light emission unit 31 includes a power receiving side connector 32 with a power cord 33 therebetween. The power source pole 10 is electrically connected with the light emission unit 31 through the power source side connector 14 and the power receiving side connector 32.

The light emission unit 31 includes the power cord 33 and thus is more flexibly located. Extending the power cord 33 allows the light emission unit 31 to be installed at a location apart from the power source pole 10.

Although in FIG. 3, one power source side connector 14 is located in the side face of the connector attachment unit 13 of the power source pole 10, a plurality of the power source side connectors 14 may be located as illustrated in FIG. 2. The power receiving side connector 32 may be directly attached to the light emission unit 31 so that the power cord 33 is eliminated. In this case, if the connector attachment unit 13 is rotatable on the central axis of the pole main body, it is easy to change the direction of the light emission unit 31.

Figure 4:
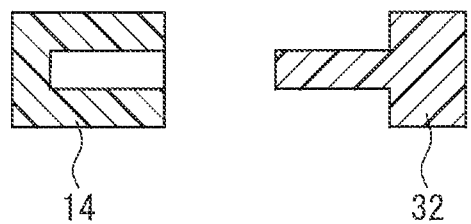
FIG. 4 is a schematic cross-sectional view illustrating a power source side connector and a power receiving side connector of the embodiment.

FIG. 4 is a schematic cross-sectional view illustrating the power source side connector and the power receiving side connector of the present embodiment. In FIG. 4, the power source side connector 14 includes a receptacle socket, and the power receiving side connector 32 includes a plug pin. The power receiving side connector 32 includes the plug pin with one pin in FIG. 4, but may include a plug pin with, e.g., two or three pins. In this case, the number of pin-receiving holes of the power source side connector 14 is equal to the number of the pins of the power receiving side connector 32.

The power source side connector 14, the power receiving side connector 32, and the power cord 33, which each include an electric current line, may each include a communication line in addition to the electric current line.

(Multifunctional Apparatus)

A multifunctional apparatus of the present application includes the above-described power source pole of the present application, and an outside unit. The outside unit includes a power receiving side connector. The power source side connector of the power source pole is connected with the power receiving side connector of the outside unit.

The multifunctional apparatus of the present application includes the power source pole that can function as an off-the-grid power source that is independent from an electrical grid, and the outside unit that is supplied with electric power from the power source pole. Selecting the type of the outside unit allows the multifunctional apparatus of the present application to be effectively used as a multifunctional apparatus that can deal with various intended uses in a region that is isolated from an electrical grid and a region to which it is difficult to supply electric power from an electrical grid due to a natural disaster such as an earthquake.

In the multifunctional apparatus of the present application, since the power source side connector of the power source pole is connected with the power receiving side connector of the outside unit, the outside unit can be flexibly removed from the power source pole. This allows various types of the outside units to be attached to the power source pole depending on necessity, and thus allows the power source pole to act as the multifunctional apparatus that can be used for various intended uses. Adjusting the number, location, and the like of the power source side connector of the power source pole makes it easy to change the direction of the outside unit according to the function of the outside unit. In particular, if a plurality of the outside units is installed, it is easy to appropriately orient each outside unit.

The power receiving side connector preferably includes a plug pin. This makes it easy to connect and disconnect the outside unit to and from the power source pole.

Any type of the outside unit can be used. For example, a light emission unit, a camera unit, a sensor unit, and a communication unit can be used. One type or a plurality of types of the outside units may be used.

Hereinafter, an embodiment of the multifunctional apparatus of the present application will be described with reference to the drawings. However, the explanation for the power source pole of the present application will not be repeated.

Figure 5:
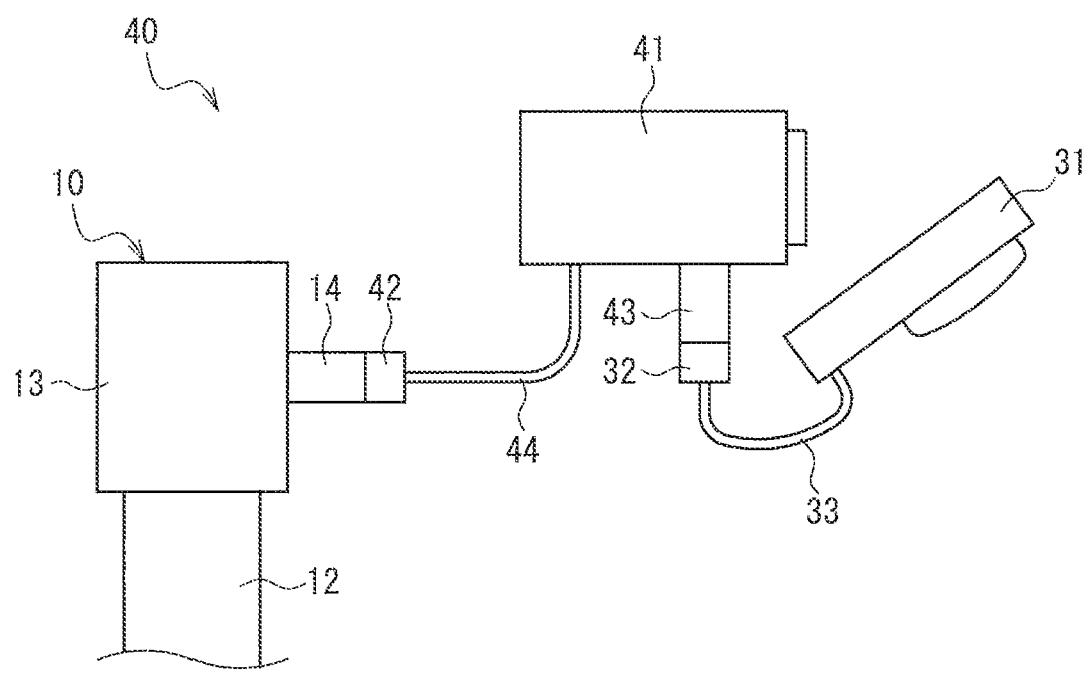
FIG. 5 is a schematic partial side view illustrating an exemplary multifunctional apparatus of an embodiment.

FIG. 5 is a schematic partial side view illustrating an exemplary multifunctional apparatus of the present embodiment. In FIG. 5, a multifunctional apparatus 40 includes the power source pole 10 as illustrated in FIG. 1, a light emission unit 31, and a camera unit 41. The power source side connector 14 is provided in the side face of the connector attachment unit 13 of the power source pole 10.

The camera unit 41 includes a power receiving side connector 42 with a power cord 44 therebetween. The power source pole 10 is electrically connected with the camera unit 41 through the power source side connector 14 and the power receiving side connector 42. The camera unit 41 also includes an intermediate power source side connector 43.

The light emission unit 31 includes a power receiving side connector 32 with a power cord 33 therebetween. The camera unit 41 is electrically connected with the light emission unit 31 through the intermediate power source side connector 43 and the power receiving side connector 32.

As illustrated in FIG. 5, since the power source pole 10, the light emission unit 31, and the camera unit 41 are connected with each other through the connectors, it is easy to directly or indirectly attach and detach the light emission unit 31 and the camera unit 41 to and from the power source pole 10.

The camera unit 41 and the light emission unit 31 include the power cord 44 and the power cord 33, respectively, and thus are more flexibly located. Extending the power cord 44 and the power cord 33 allows the camera unit 41 and the light emission unit 31 to be installed at locations apart from the power source pole 10.

Although in FIG. 5, one power source side connector 14 is located in the side face of the connector attachment unit 13 of the power source pole 10, a plurality of the power source side connectors 14 may be located as illustrated in FIG. 2. The power receiving side connector 42 may be directly attached to the camera unit 41 so that the power cord 44 is eliminated. In this case, if the connector attachment unit 13 is rotatable on the central axis of the pole main body, it is easy to change the direction of the camera unit 41. The power receiving side connector 32 may be directly attached to the light emission unit 31 so that the power cord 33 is eliminated.

The power source side connector 14 and the intermediate power source side connector 43 may each include a receptacle socket. The power receiving side connectors 32 and 42 may each include a plug pin with, e.g., one, two, or three pins. In this case, the number of pin-receiving holes of the power source side connector 14 is equal to the number of the pins of the power receiving side connector 42. The number of pin-receiving holes of the intermediate power source side connector 43 is equal to the number of the pins of the power receiving side connector 32.

The power source side connector 14, the intermediate power source side connector 43, the power receiving side connectors 32 and 42, and the power cords 33 and 44, which each include an electric current line, preferably each include a communication line in addition to the electric current line. This enables information data exchange between the power source pole 10, the camera unit 41, and the light emission unit 31. For example, if the housing portion of the power source pole 10 houses a communication apparatus as the built-in equipment, image data can be transferred to the communication apparatus from the camera unit 41 through the communication lines, and then transmitted to the outside from the communication apparatus.

Figure 6:
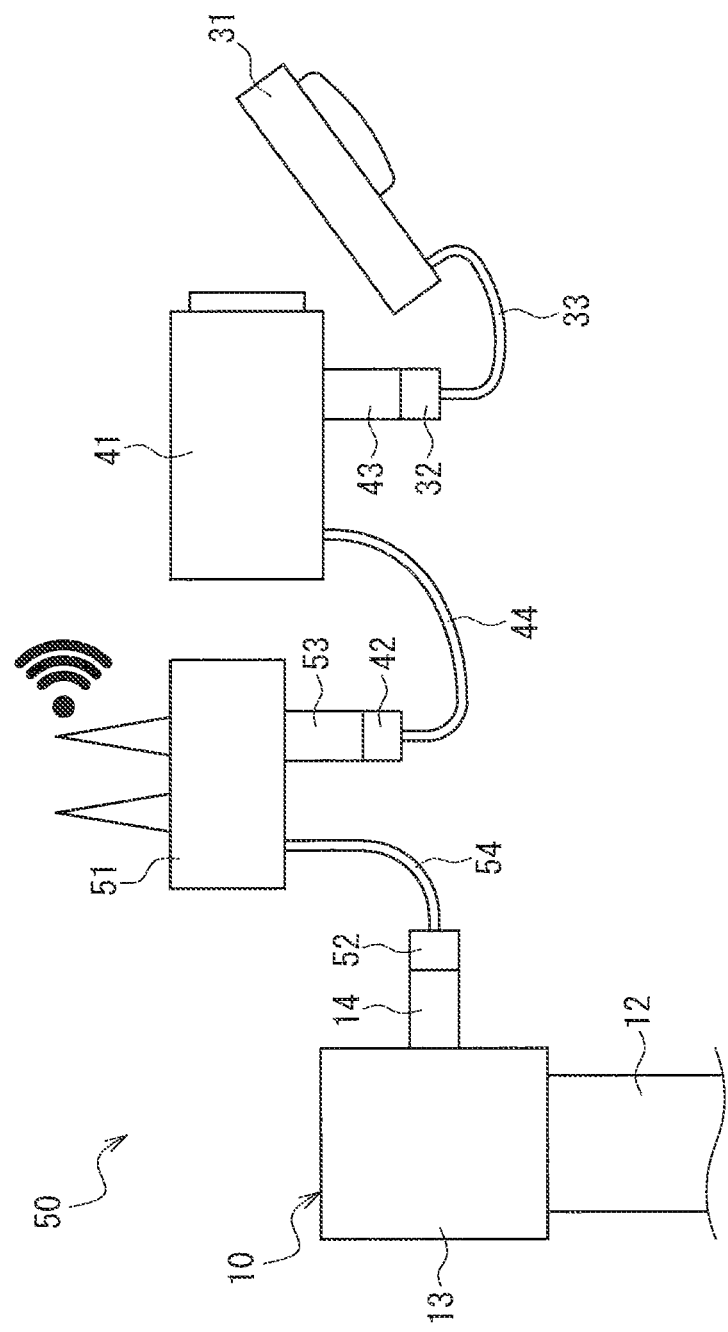
FIG. 6 is a schematic partial side view illustrating another exemplary multifunctional apparatus of the embodiment.

FIG. 6 is a schematic partial side view illustrating another exemplary multifunctional apparatus of the present embodiment. In FIG. 6, a multifunctional apparatus 50 includes the power source pole 10 as illustrated in FIG. 1, a light emission unit 31, a camera unit 41, and a communication unit 51. The power source side connector 14 is provided in the side face of the connector attachment unit 13 of the power source pole 10.

The communication unit 51 includes a power receiving side connector 52 with a power cord 54 therebetween. The power source pole 10 is electrically connected with the communication unit 51 through the power source side connector 14 and the power receiving side connector 52. The communication unit 51 also includes an intermediate power source side connector 53.

The camera unit 41 includes a power receiving side connector 42 with a power cord 44 therebetween. The communication unit 51 is electrically connected with the camera unit 41 through the intermediate power source side connector 53 and the power receiving side connector 42. The camera unit 41 also includes an intermediate power source side connector 43.

The light emission unit 31 includes a power receiving side connector 32 with a power cord 33 therebetween. The camera unit 41 is electrically connected with the light emission unit 31 through the intermediate power source side connector 43 and the power receiving side connector 32.

As illustrated in FIG. 6, since the power source pole 10, the light emission unit 31, the camera unit 41, and the communication unit 51 are connected with each other through the connectors, it is easy to directly or indirectly attach and detach the light emission unit 31, the camera unit 41, and the communication unit 51 to and from the power source pole 10.

The communication unit 51, the camera unit 41, and the light emission unit 31 include the power cord 54, the power cord 44, and the power cord 33, respectively, and thus are more flexibly located. Extending the power cord 54, the power cord 44, and the power cord 33 allows the communication unit 51, the camera unit 41, and the light emission unit 31 to be installed at locations apart from the power source pole 10.

Although in FIG. 6, one power source side connector 14 is located in the side face of the connector attachment unit 13 of the power source pole 10, a plurality of the power source side connectors 14 may be located as illustrated in FIG. 2. The power receiving side connector 52 may be directly attached to the communication unit 51 so that the power cord 54 is eliminated. In this case, if the connector attachment unit 13 is rotatable on the central axis of the pole main body, it is easy to change the direction of the communication unit 51. The power receiving side connector 42 may be directly attached to the camera unit 41 so that the power cord 44 is eliminated. The power receiving side connector 32 may be directly attached to the light emission unit 31 so that the power cord 33 is eliminated.

The power source side connector 14 and the intermediate power source side connectors 43 and 53 may each include a receptacle socket. The power receiving side connectors 32, 42, and 52 may each include a plug pin with, e.g., one, two, or three pins. In this case, the number of pin-receiving holes of the power source side connector 14 is equal to the number of the pins of the power receiving side connector 52. The number of pin-receiving holes of the intermediate power source side connector 43 is equal to the number of the pins of the power receiving side connector 32. The number of pin-receiving holes of the intermediate power source side connector 53 is equal to the number of the pins of the power receiving side connector 42.

The power source connector 14, the intermediate power source side connectors 43 and 53, the power receiving side connectors 32, 42, and 52, and the power cords 33, 44, and 54, which each include an electric current line, preferably each include a communication line in addition to the electric current line. This enables information data exchange between the communication unit 51, the camera unit 41, and the light emission unit 31. For example, image data can be transferred to the communication unit 51 from the camera unit 41 through the communication lines, and then transmitted to the outside from the communication unit 51.

Figure 7:
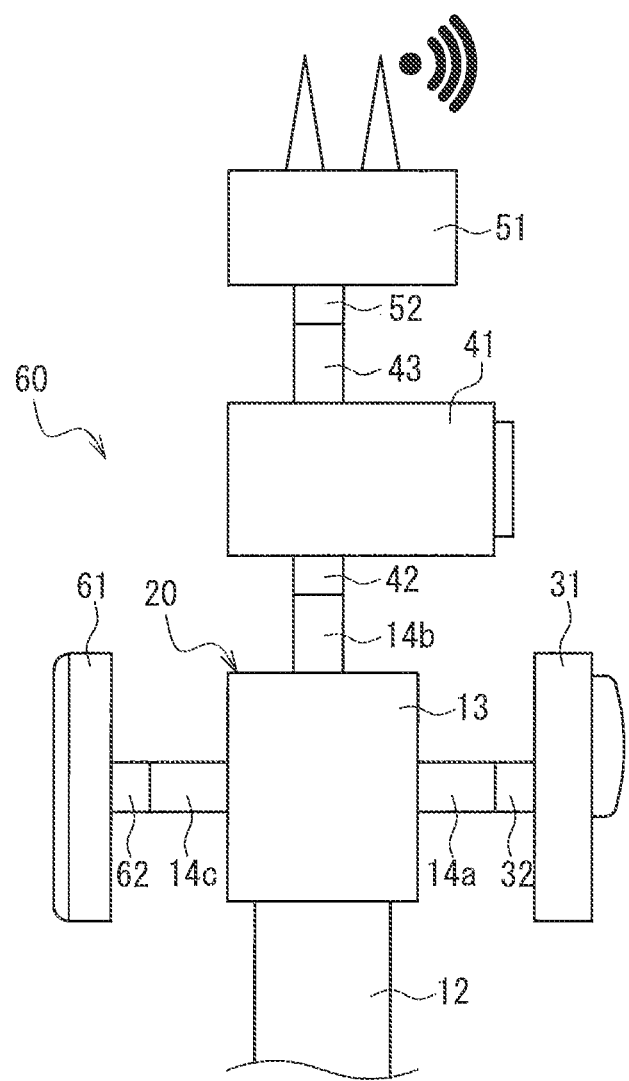
FIG. 7 is a schematic partial side view illustrating another exemplary multifunctional apparatus of the embodiment.

FIG. 7 is a schematic partial side view illustrating another exemplary multifunctional apparatus of the present embodiment. In FIG. 7, a multifunctional apparatus 60 includes the power source pole 20 as illustrated in FIG. 2, a light emission unit 31, a camera unit 41, a communication unit 51, and a sensor unit 61. The power source side connectors 14a, 14b, and 14c are provided for the connector attachment unit 13 of the power source pole 20.

The light emission unit 31 directly includes a power receiving side connector 32. The power source pole 20 is electrically connected with the light emission unit 31 through the power source side connector 14a and the power receiving side connector 32.

The camera unit 41 directly includes a power receiving side connector 42. The power source pole 20 is electrically connected with the camera unit 41 through the power source side connector 14b and the power receiving side connector 42. The camera unit 41 also includes an intermediate power source side connector 43.

The communication unit 51 directly includes a power receiving side connector 52. The camera unit 41 is electrically connected with the communication unit 51 through the intermediate power source side connector 43 and the power receiving side connector 52.

The sensor unit 61 directly includes a power receiving side connector 62. The power source pole 20 is electrically connected with the sensor unit 61 through the power source side connector 14c and the power receiving side connector 62.

As illustrated in FIG. 7, since the power source pole 20, the light emission unit 31, the camera unit 41, the communication unit 51, and the sensor unit 61 are connected with each other through the connectors, it is easy to directly or indirectly attach and detach the light emission unit 31, the camera unit 41, the communication unit 51, and the sensor unit 61 to and from the power source pole 20.

In FIG. 7, the power source side connectors 14a, 14b, and 14c are located in the side face and top face of the connector attachment unit 13 of the power source pole 20. In this case, if the connector attachment unit 13 is rotatable on the central axis of the pole main body, the directions of the outside units (the light emission unit 31, the camera unit 41, the communication unit 51, and the sensor unit 61) can be changed.

The power source side connectors 14a, 14b, and 14c and the intermediate power source side connector 43 may each include a receptacle socket. The power receiving side connectors 32, 42, 52, and 62 may each include a plug pin with, e.g., one, two, or three pins. In this case, the number of pin-receiving holes of the power source side connector 14a is equal to the number of the pins of the power receiving side connector 32. The number of pin-receiving holes of the power source side connector 14b is equal to the number of the pins of the power receiving side connector 42. The number of pin-receiving holes of the power source side connector 14c is equal to the number of the pins of the power receiving side connector 62. The number of pin-receiving holes of the intermediate power source side connector 43 is equal to the number of the pins of the power receiving side connector 52.

The power source side connectors 14a, 14b, and 14c, the intermediate power source side connector 43, and the power receiving side connectors 32, 42, 52, and 62, which each include an electric current line, preferably each include a communication line in addition to the electric current line. This enables information data exchange between the communication unit 51, the light emission unit 31, the camera unit 41, and the sensor unit 61. For example, image data can be transferred to the communication unit 51 from the camera unit 41 through the communication lines, and then transmitted to the outside from the communication unit 51. Further, observed data can be transferred to the communication unit 51 from the sensor unit 61 through the communication lines, and then transmitted to the outside from the communication unit 51.

As described above, the power source side connector, the intermediate power source side connector, and the power receiving side connector each function as a hardware interface for connecting the power source pole with the outside unit. Locating a plurality of the multifunctional apparatuses each including the communication unit and any of the other outside units in a specific region can form an information communication network system.

Using the information communication network system allows an atmosphere (e.g., temperature, humidity, atmospheric pressure, solar radiation, and rainfall) observation system, and a ground environment (e.g., landslide, inclination, debris flow, and water level) observation system (e.g., a ground observation system, a river observation system, and a crime prevention system) to be operated, for example.

The present application may be embodied in other forms. The embodiments disclosed in this application are to be considered in all respects as illustrative and not limitative. The scope of the invention is indicated by the appended claims rather than by the foregoing description, and all changes which come within the meaning and range of equivalency of the claims are intended to be embraced therein.

DESCRIPTION OF REFERENCE NUMERALS 10, 20 power source pole
11 pole main body
12 solar power generation sheet
13 connector attachment unit
14 power source side connector
14a, 14b, 14c power source side connector
30 illumination apparatus
31 light emission unit
32, 42, 52, 62 power receiving side connector
33, 44, 54 power cord
40, 50, 60 multifunctional apparatus
41 camera unit
43, 53 intermediate power source side connector
51 communication unit
61 sensor unit
The invention claimed is:
1. A multifunctional apparatus comprising:
a power source pole; and
an outside unit, wherein the power source pole includes a pole main body, a solar cell module, a storage battery, and a power source side connector, the solar cell module and the power source side connector are located outside the pole main body, the storage battery is charged with electric power generated by the solar cell module, the electric power of the storage battery is output to the outside through the power source side connector, the outside unit includes a power receiving side connector and an intermediate power source side connector, the outside unit includes at least one selected from the group consisting of a light emission unit, a camera unit, a sensor unit, and a communication unit, and the power source side connector of the power source pole is directly connected with the power receiving side connector of the outside unit, or indirectly connected with the power receiving side connector of the outside unit through the intermediate power source side connector.

2. The multifunctional apparatus according to claim 1, wherein the power source side connector and the intermediate power source side connector each include a receptacle socket.

3. The multifunctional apparatus according to claim 1 or 2, wherein the power source side connector is attached to the pole main body via an attachment unit that is removable.

4. The multifunctional apparatus according to claim 3, wherein the attachment unit has a cap-like shape and is installed at a distal end of the pole main body.

5. The multifunctional apparatus according to claim 3, wherein the attachment unit is rotatable on a central axis of the pole main body.

6. The multifunctional apparatus according to claim 1, wherein the solar cell module includes a flexible solar power generation sheet wound around an exterior surface of the pole main body.

7. The multifunctional apparatus according to claim 1, wherein the power source side connector, the power receiving side connector, and the intermediate power source side connector each include an electric current line and a communication line.

8. The multifunctional apparatus according to claim 1, wherein the power receiving side connector includes a plug pin.

* * * * *